May 21, 1968  R. F. LEONARD  3,384,237

CONVEYOR DISCHARGE CONTROL SYSTEM

Filed Oct. 6, 1965  3 Sheets-Sheet 1

INVENTOR
Roy F. Leonard
BY
ATTORNEYS.

May 21, 1968 R. F. LEONARD 3,384,237
CONVEYOR DISCHARGE CONTROL SYSTEM
Filed Oct. 6, 1965 3 Sheets-Sheet 2
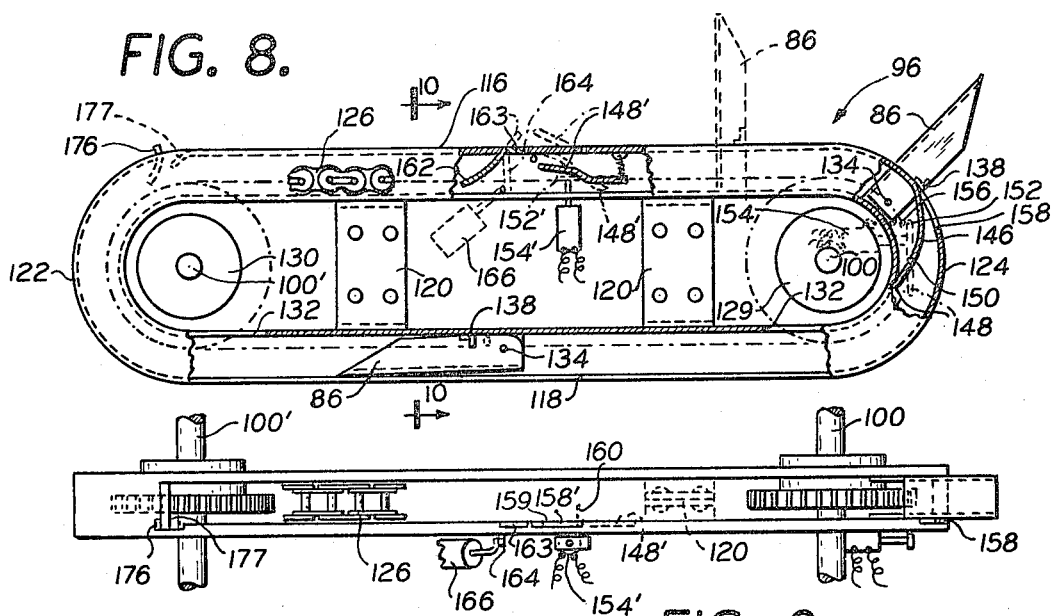
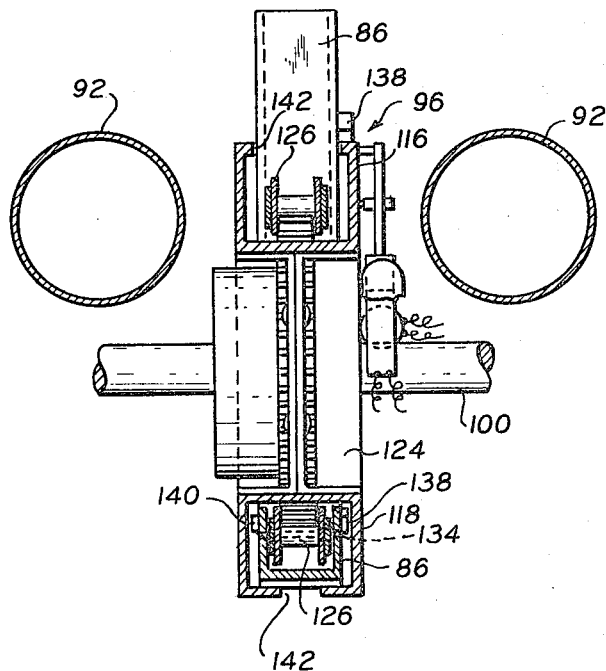
INVENTOR
Roy F. Leonard
BY
ATTORNEYS.

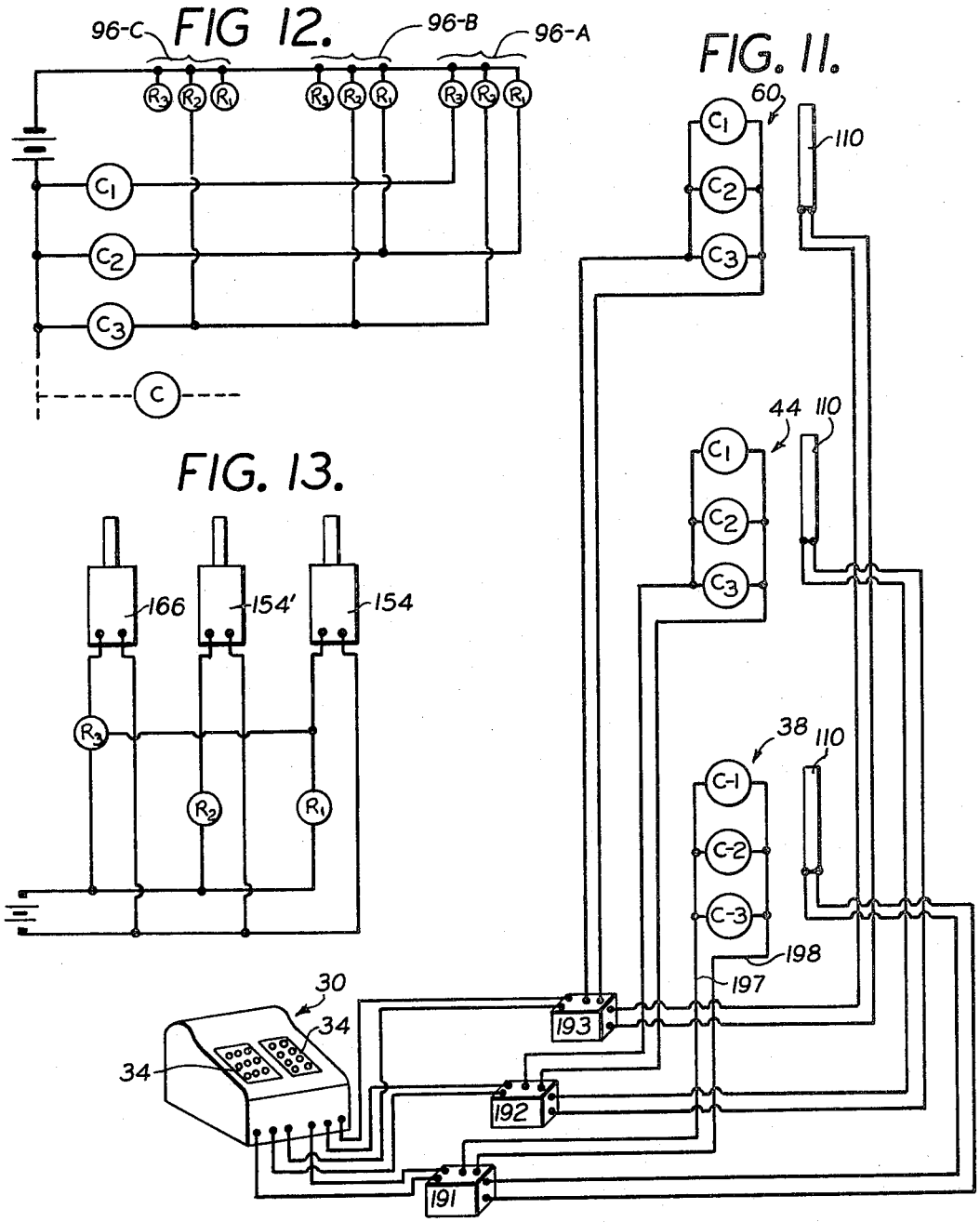

3,384,237
Patented May 21, 1968

3,384,237
CONVEYOR DISCHARGE CONTROL SYSTEM
Roy F. Leonard, 521 Roosevelt Ave.,
River Vale, N.J. 07675
Filed Oct. 6, 1965, Ser. No. 493,398
13 Claims. (Cl. 209—122)

ABSTRACT OF THE DISCLOSURE

This specification discloses a conveyor system in which all of the articles travel along a first section and are programed in sequence into a control system that has memory for controlling switching stations beyond the first section. There are means at each switching station for identifying particular packages as programed and mechanism responsive to the identifying means and operable while the articles on the conveyor continue in motion to dislodge them onto the switch. An individual switching station includes a frame with conveyor rollers and a push-off means including an element at a fixed location below the plane of the top of the conveyor rollers and including an abutment carried by said element and movable into a position above that plane and while outward beyond the side of an article on the conveyor.

---

This invention relates to improved apparatus and method for removing selected articles from a moving conveyor at pre-selected removal stations or switches of a plurality of stations along the length of the conveyor.

The conveyor systems of the prior art, having provisions for removing pre-selected packages at various stations along the conveyor, have been subject to one or more of several major disadvantages. Some are restricted to a straight line path and some to a single elevation or plane. They relate the sorting activity to the carton position on the conveying means, or the distance along a fixed path from a specific reference point. Many of them afford no accumulation feature and when once constructed they are not easily remodeled, updated, or rescheduled. They require that maintenance be done on the entire system, and have no provisions for removal and replacement of individual station units; and some are restricted in many applications by high overhead dimension (thickness) of the sorting mechanism. Generally they require space between the cartons.

It is an object of this invention to provide an improved and more flexible conveyor system with provisions for deflecting or switching pre-selected pieces from the conveyor system at any desired removal stations. A more specific object is to control the discharge of articles from the conveyor by a controlled procedure based on the sequence with which the articles pass along the conveyor; or in other words, by counting the articles as they pass through the system.

Another object is to provide discharge or sorting stations along the conveyor that are independent of the means for transporting pieces between the stations. These sorting stations may be connected by belts, rollers, slats, or other types of powered or unpowered conveyor sections. Included in the possibilities between sections is the use of accumulation type conveyors. Each station along the route may be made to consist of identical components. The stations themselves are removable, the units comprising the stations are themselves removable. It is a feature of this invention that the stations are interchangeable mechanically, electrically compatible, and easily programed.

The preferred embodiment of the invention includes one console control station connected electrically to all of the sorting stations. An attendant at the console control station operates control apparatus to set up a program based on the sequence with which articles pass the console control station and this program determines the sorting station station at which the piece will be discharged from the conveyor and also controls the push-off for dislodging articles or pieces from the conveyor at each particular sorting station for which the program requires a particular sequential piece or article to be displaced from the conveyor. The attendant at the console control station also imparts a signal for each piece commensurate with the length of the piece and this influences the number of pushers that operate at the sorting station where that particular piece is discharged or displaced from the conveyor.

Thus the attendant supplies two signals to the control means for each article. The signal which determines the sorting station at which the article will be displaced from the conveyor may be termed the "destination signal"; and the signal which determines the number of pushers that operate at a particular sorting station may be termed the "length signal."

Other objects, features and advantages of the invention will appear or be pointed out as the description proceeds. In the drawing, forming a part hereof, in which like reference characters indicate corresponding parts in all the views:

FIGURE 8 is a greatly enlarged detail view, partly broken away and in section, showing the independent push-off apparatus which is located between each of the rollers in FIGURES 5 and 6;

FIGURE 9 is a top plan view, with parts broken away, of the apparatus shown in FIGURE 8;

FIGURE 10 is a greatly enlarged sectional view taken on the line 10—10 of FIGURE 8;

FIGURE 11 is a wiring diagram for the sorting station shown in the conveyor system of FIGURE 1 details of which are shown in the other figures;

FIGURE 12 is a wiring diagram showing the connection of the controllers of one sorting station of FIGURE 11 with the relays for the different sorter units at that control station; and FIGURE 13 is a wiring diagram showing the way in which one group of relays of FIGURE 12 is connected with the sorter unit which the relays of that group control.

Figure 1:
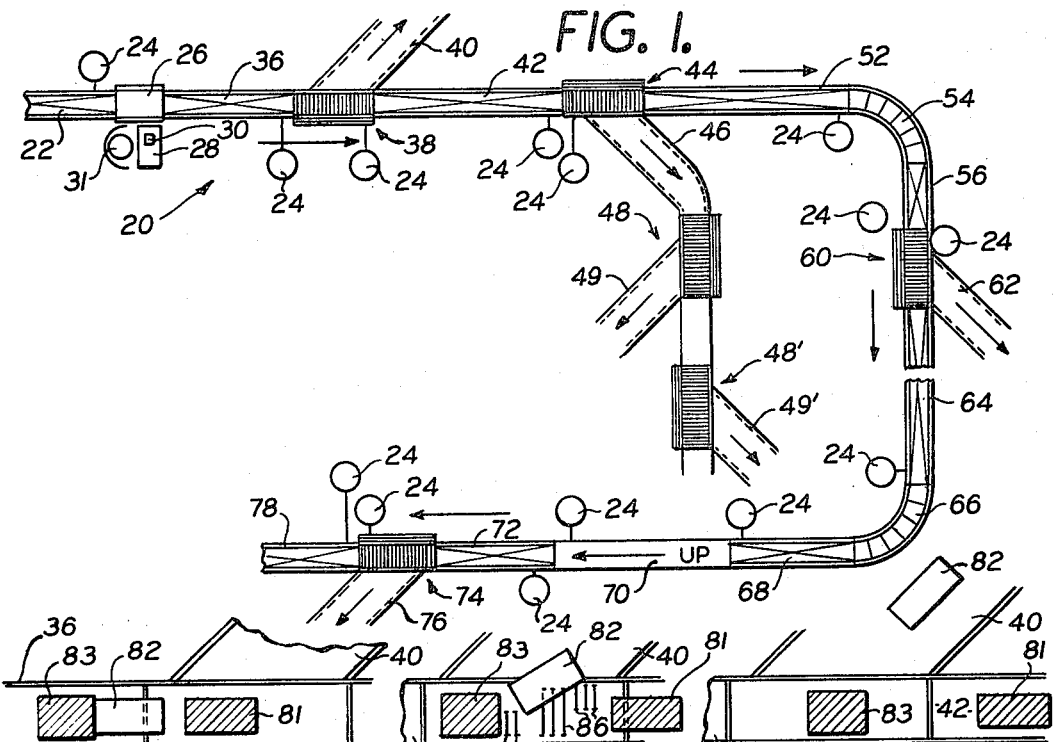
FIGURE 1 is a diagrammatic top plan view of a conveyor system made in accordance with this invention.

FIGURE 1 shows an initial conveyor section 22 driven by an electric motor 24 and which supplies articles to a console section 26 of the conveyor system. There is a console 28 located adjacent to the section 26 and there is a keyboard 30 on the console for operation by an attendant seated at the console in a seat 31.

A larger scale view of the keyboard 30 is shown in includes a group of keys for imparting designation signals to the controllers, and it has another group of keys 34 for imparting length signals to the controllers. There is preferably a separate key in the group 32 for every sorting station and the attendant pushes the key for the particular station at which an article is to be sorted as that article passes in sequence across the console section of the conveyor. The keys of the key group 34 are operated to indicate the classification of length of the article. The additional length necessary to put an article from one classification into the next depends upon the design of the conveyor system and the flexibility which is desired when using the conveyor system for articles having a substantial variety of lengths.

Referring again to FIGURE 1, articles leaving the console section 26 travel along a standard conveyor section 36 which is driven by a motor 24 and which may be of conventional construction. It is a feature of this invention that while the apparatus at the sorting stations is specially built apparatus, the sections of the conveyor between the sorting stations can be conventional conveyor sections.

At the end of the conveyor section 36, the articles pass onto the first sorting station 38 which consists of a conveyor section driven by its own motor 24. Although different constructions can be used for the sorting stations within the broader aspects of this invention, the preferred embodiment employs a roller conveyor with pusher fingers attached to sorter units located between successive rollers and these fingers are operable to displace an article from the sorting station conveyor section 38 to a branch conveyor 40 which leads to a delivery station or to sub-sorting stations as desired.

Articles which are not sorted at the station 38 by being dislodged to the branch conveyor 40 travel along another conveyor section 42, driven by motor 24, to a second sorting station 44. The construction at the sorting station 44 is preferably identical to that of the sorting station 38 though the sorting station is turned the other way so as to deliver articles to a branch conveyor 46 on the right side of the sorting station 44 instead of on the left side of the sorting station as in the case of the sorting station 38.

The branch conveyor 46 carries articles to subsorting stations 48 and 48′ which in turn deliver the articles to branch conveyors 49 and 49′, respectively and articles which are not displaced from the branch conveyor 46 at these sorting stations 48 and 48′ continue along the conveyor 46 to a delivery station or other terminus.

Articles which continue along the main conveyor system beyond the sorting station 44 travel along a conveyor section 52, driven by its own motor 24 and then pass around a curved conveyor section 54 which leads to another conveyor section 56 which in turn delivers articles to a third main sorting station 60 from which articles to be removed are displaced onto a branch conveyor 62.

Remaining articles travel along another section 64 and around a curved conveyor section 66 to a conveyor section 68 which extends generally parallel to the conveyor sections 36, 42 and 52 but on the opposite side of the room. Beyond this conveyor section 68 there is a conveyor section 70 which leads upward to a higher level such as the next floor of the building, and this conveyor section for moving the articles to a higher level is driven, like the other conveyor sections, by its own electric motor 24.

At the higher level the articles continue to advance by travel along another conveyor section 72 which delivers them to a fourth main sorting station 74 where some of the articles are displaced onto a branch conveyor 76. Articles which have not been sorted for any of the branch conveyors up to this location continue along another conveyor section 78 to any subsequent sorting stations which may be used or to a delivery table as the case may be depending upon the number of classifications into which the articles are to be sorted.

Figures 2, 3, 4:
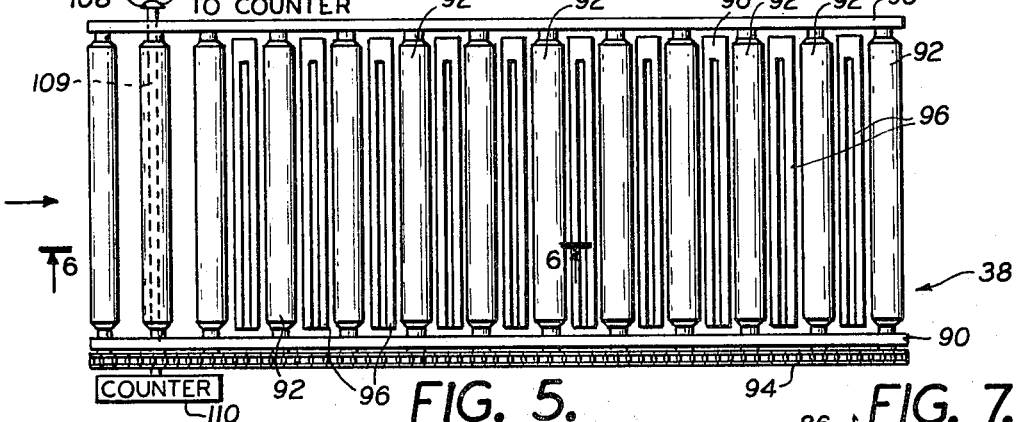
FIGURES 2, 3 and 4 are greatly enlarged, diagrammatic plan views showing the way in which an article is displaced from the conveyor at a sorting station.

FIGURES 2, 3 and 4 show the way in which successive articles are separated from one another and how an article is displaced at the sorting station 38. This is representative of the operation of the other sorting stations also. In FIGURE 2 there are three articles 81, 82 and 83 shown on the main conveyor. The article 81 is traveling along the sorting station conveyor section but the articles 82 and 83 are still on the conveyor section 36. It is quite common for the articles to be close together on the conveyor section 36 and in FIGURE 2 the articles 82 and 83 are shown actually touching one another. The article 81 which may have been touching the article 82 as they traveled along the conveyor section 36 moves clear of the article 82 when it reaches the sorting station 38 because the sorting station 38 is driven at a slightly higher speed than the conveyor section 36 and thus causes each article to pull away from the article behind it so that there is some clearance both ahead of and behind the article 81, and there is always such a clearance for every article that travels across the sorting station 38.

The article 81 is not displaced from the main conveyor at the sorting station 38 because it is not one of the articles for which a signal was given at the console for displacement at the sorting station 38. Article 82, which is shown without crosshatching in order to distinguish it from the adjacent articles 81 and 82 in the drawing, is one of the articles which is to be displaced or switched from the main conveyor at the sorting station 38. Article 83 is one which is to pass the sorting station 38 for sorting at a subsequent station. It should be understood that the difference in appearance of the articles 81, 82 and 83; that is, the hatching of two of the articles, is merely for purposes of distinguishing them in the drawings and there is no difference in the appearance of articles in the operation of this invention. The invention does not depend upon any coding or other marking on the articles but only upon the sequence of signals that are given to the control system at the console as the articles are fed onto the conveyor system.

As the article 82 moves onto the conveyor section of sorting station 38, it pulls clear of the article 83, in the same manner as the article 81 pulled away from article 82, already described. When the article 82 reaches a predetermined location on the sorting station 38 groups of abutments or fingers 86 located between rollers of the conveyor section of the sorting station 38 move upward and across the sorting station to displace the article 82 as shown in FIGURE 3. This apparatus will be described in more detail in connection with FIGURES 8–10 but for the present it is sufficient to understand that the number of abutments or fingers 86 which are actuated to displace the article 82 depend upon the length of the article 82 which was indicated to the control mechanism by the attendant when he operated the keyboard 34 (FIGURE 11) at the console to indicate the length of the article 82 at the same time that he gave the destination signal by operating the keyboard 32.

It shall also be noted in FIGURE 3 that the fingers or abutments 86 of the forward end of the article 82 move ahead of the other fingers or abutments so as to swing the article 32 into substantial alignment with the branch conveyor 40. This is a refinement which makes possible the use of narrower branch conveyors but it is not a necessary feature of the present invention.

FIGURE 4 shows the article 82 traveling along the branch conveyor 40 away from the sorting station 38 while the article 83 travels across the sorting station without interruption and the article 81 continues its travel along section 42 of the main conveyor.

Figure 5:
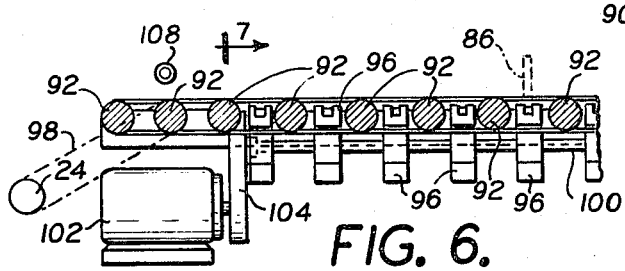
FIGURE 5 is a greatly enlarged top plan view of one of the sorting stations in FIGURE 1.

FIGURE 5 shows the sorting station 38. It includes side frames 90 which support conveyor rollers 92 and these conveyor rollers have sprockets and are driven by an endless chain 94. There is a sorter unit 96 located between each of the successive conveyor rollers 92 along at least as much of the length of the sorting station 38 as necessary for operating on the longest article with which the sorting station is intended to be used.

In the illustrated construction there are sorter units 96 between all of the rollers 92 except the first three rollers. Thus there are altogether ten sorter units at the sorting station 38. If the conveyor system is designed for relatively short articles, then the number of sorter units would be less, but provision is made for having the sorter units extend along a slightly greater length of the sorter station than the length of the article so as to provide some tolerance for the position of the article on the conveyor at the time that the sorter units operate. Since the friction between different articles and the rollers 92 will vary from time to time and from article to article, this provision for variation in position is required for reliable operation. It is important, however, that the number of sorter units which operate at a given time must not be so much in excess of the length of the particular article to be switched from the main conveyor that some of the sorter units might strike the next article following the one to be sorted.

Figures 6, 7:
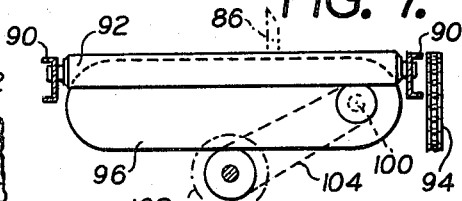
FIGURE 6 is a fragmentary, diagrammatic sectional view taken on the section line 6—6 of FIGURE 5.
FIGURE 7 is an end view of the sorting station shown in FIGURES 5 and 6.

The chain 90 for driving the rollers 92 receives its power from the motor 24 (FIGURE 6) through another chain or belt 98. It will be understood that this driving mechanism for the rollers 98 is merely illustrative of power means for operating the conveyor section of the sorting station 38. FIGURE 6 also shows the separate sorter units 96 driven by a common drive shaft 100 which is operated by a motor 102 through motion transmitting connections comprising a belt or chain over pulleys or sprockets, this motion transmitting connection being designated by the reference character 104.

As each article reaches the sorting station 38, it must be counted in order to cause the control means to operate in the desired sequence. Various means can be employed for counting the articles. Such means may be mechanically actuated or may be optical. FIGURE 5 shows an optical system in which a light 108 discharges a beam 109 across the entrance end of the sorting station 38 to a counter 110 which preferably includes a photocell or other light-sensitive means. As each article shuts off the light beam 109 successively, the counter 110 records the passage of another article. At subsequent sorting stations, provision is made for not counting articles which have destination signals for earlier sorting stations. This will be explained more fully in connection with the description of the operation of the signal system.

The shaft 100 can be withdrawn and any sorter units 96 can be removed from the sorting station 38. Removed sorter units can be replaced, since it is a feature of the invention that they are interchangeable. The same construction as shown for the sorter station 38 can be used in a conveyor system for articles of different lengths with simplified controls by merely equipping the sorter station with fewer sorter units 96 as may be commensurate with the length of the articles to be sorted.

FIGURES 8, 9 and 10 show diagrammatically the construction of one of the sorter units 96. The unit consists of a frame comprising an upper track 116, and a lower 118 connected together by brackets 120 and also joined by semicircular track sections 122 and 124. An endless belt or chain 126 runs in the tracks 116 and 118 and the connecting semicircular track sections 122 and 124. There are sprockets 129 and 130 on the shaft 100 and on a parallel shaft 100′, respectively, at opposite ends of the sorter unit 96.

There are slots 132 in the housing formed by the tracks 116 and 118 and the semicircular track sections 122 and 124 for admitting the sprockets 129 and 130 into the interior of the housing so as to engage the chain 126.

There are fingers 86 connected with the chain 126 by pivot pins 134 at different locations along the chain 126. The fingers 86 are of channel cross-section so that when folded back parallel to the chain 126 as in the case of the finger 86 within the lower track 118, the chain 126 extends lengthwise through the finger and the finger 86 is completely contained within the track 118, as shown in FIGURES 8 and 10. On one side of each finger 86 there is a cam follower 138.

The lower track 118 has a slot 142 which is narrower than the width of the finger 86 so that while the fingers 86 are traveling along the lower part of the sorter unit 96, they are confined within the housing formed by the track elements; but this slot 142 becomes wider at the semicircular track sections 122 and 124 and there is provision for making it wider at times along the upper track 116 so that a finger 86 can swing upwardly to project outwardly beyond the track 116; or an already-projecting finger can swing back into the interior space within the track.

Within the semicircular track section 124 there is a fixed switch element 146 attached to the side of the track section 124 on the same side of the finger 86 as is the follower 138. A movable switch element 148 can be shifted into the full-line position shown in FIGURE 8 by angular movement about a pivot pin 150 which extends through a side wall of the track section 124. The pin 150 is oscillated, to swing the movable switch elements 148 between full-line and dotted-line positions, by a lever 152 attached to the outer end of the pin 150. This lever 152 is moved clockwise by a solenoid 154, and when the solenoid is de-energized, the lever 152 is moved counterclockwise by a spring 156 tensioned between one end of the lever 152 and a fixed lug on the solenoid 154.

When the movable switch element is in a raised position, corresponding to the de-energized position of the solenoid 154 and the counterclockwise movement of the lever 152, then the follower 138 on the finger 86 can move under the movable switch element 148 and can pass it without being thrust outward.

If the solenoid 154 is energized, however, and the lever 152 is rocked clockwise to move movable switch element 148 into the solid-line positions shown in FIGURE 8, then the follower 138 of the finger 86 strikes the movable switch element 148 and travels up the outside surface of this movable switch element and beyond the pin 150 and along the outside surface of the fixed switch element 146 until the finger 86 is in the raised position shown in FIGURE 8 at the upper right-hand portion of that figure. There is a clearance 158 at one side of the slot 142 where the slot is wider to permit passage of the follower 138 to a position outside of the track section 124; and beyond this clearance 158, the follower 138 travels along the outside surface of the track section 124 and the upper track 116 to maintain the finger 86 in raised position so that it cannot be knocked down when it strikes against an article which is to be displaced from the conveyor section of the sorting station. FIGURE 8 shows the finger 86 in dotted lines as it travels along the top of the track 116 in an elevated position for displacing articles from the conveyor.

If the solenoid 154 is not energized, the finger 86 does not rise as it passes around the semicircular track section 124, as previously explained; but means are provided for raising the finger 86 at another location part way across the width of the conveyor. This means includes a switch element 148′ which rocks between an inoperative position shown in solid lines and an operative position shown in dotted lines. In the latter position, the switch 148′ extends into the path of the cam follower 138 of any finger 86 that is travelling along the track section 116 in a lowered position.

This switch 148′ is operated by a solenoid 154′ in a manner similar to the operation of the solenoid 154 already described. Other corresponding parts are indicated by the same reference characters as for the switch element 148, with a prime appended. There is a wide section 158′ (FIGURE 9), for permitting the follower 138 to move up on top of the track 116 and this wide section 158′ is normally closed by a door 159 connected to the track 116 by a pivot 160. A stop 161 holds the door 159 flush with the top of the track 116 except when the door is opened by a rising finger 86.

There are two means for moving the finger 86 back into a retracted position within the housing. One of these can be actuated by the controller and the other operates automatically at the end of the travel of the finger 86 across the upper end of the sorter unit if the finger has not been moved downward before it reaches the left-hand end of the sorter unit. The means for retracting the finger 86 before it has completed its travel across the conveyor includes a fixed switch element 162 and a movable switch element 163. The latter is moved by a lever 164, operated by a solenoid 166 to shift into the path of movement of the follower 138 on the finger 86. This switch element 163 is a part of the top of the track 116 so that when it moves into the raised position shown in dotted lines in FIGURE 8, it opens up a clearance for the follower 138 to move down below the top of the track and travel along the right-hand faces of the switch elements 163 and 162 as it swings the finger 86 clockwise into retracted position. When the finger 86 is fully retracted, the follower 138 travels under the fixed switch 162 and along the bottom of the housing within the upper track 116.

At the left-hand end of the track 116 there is a downwardly-extending portion 177 of the track 116 which causes the finger 86 to swing clockwise and downward into the housing, at the end of its movement across the top of the sorter unit 96.

The mechanism for operation of the fingers 86 and the kind of pushers used in the illustrated embodiment of the invention are merely representative of pushers and operating mechanism for them controlled in accordance with the broader aspects of this invention.

FIGURE 11 shows a wiring diagram for three sorting stations of the conveyor system shown in the other views. It will be understood that extending the wiring diagram for more stations merely involves duplication. There is a register for each of the sorting stations. The keyboard 30 supplies information to a register 191 for the sorting station 38; to a register 192 for the sorting station 44; and to a register 193 for the sorting station 60. Each of these registers is connected with the destination signal keyboard 32 by an electric cable and to the length signal keyboard 34 by a different electric cable. The registers are preferably located at the console station, but each register may be located at the sorting station which it controls, and may have its connection with the keyboard 30 by means of these electric cables.

There are three controllers C-1, C-2 and C-3 at the station 38. These controllers are connected with the register 191 by electric cables 197 and 198 in such a way that one or more of the controllers C-1; C-2; C-3 are conditioned to send control signals to relays of their specific control station whenever the controller is actuated by the counter 110. The signal from this counter 110 is sent to the register 191 in response to the interruption of the light beam as described in connection with FIGURE 2, or by other article-detection apparatus.

FIGURE 12 shows the way in which controllers C-1; C-2; and C-3 of each sorting station are connected with relays R-1; R-2; and R-3 of each of three sorter units 96-A; 96-B; and 96-C of each sorting station. Each circuit controls the operation of all sorter units of the station. Different behavior or activities is predetermined by the circuitry wire into the individual circuit. Relays from each unit are wired together into logic circuits. The specific control mechanism is not a part of this invention and such circuits are well known to those skilled in the control art. For present purposes it is sufficient to understand that the particular controller that is conditioned and the relays that it operates depend upon the length signal designation imparted to the register for that sorting station.

The three relays R-1; R-2; and R-3 of each of the sorter relays control the energizing of the solenoids 154, 154' and 166 as shown in FIGURE 13. The solenoids are preferably energized in response to energizing of these relays R-1; R-2; and R-3, but the circuits can be wired so that the solenoids are energized in response to deenergizing of the relays. In FIGURES 12 and 13, the circuits are shown equipped with power sources, here shown as batteries 200, for energizing the relay circuits and solenoid circuits, respectively.

In similar manner, the controllers C-1; C-2; and C-3 at the sorting station 44 are connected with the register 192, and with relays as in FIGURE 12 and indirectly with solenoids of finger switching means as in FIGURE 13; and similarly with the controllers of the sorting station 60, and other sorting stations.

Preferred embodiments of the invention has been illustrated and described, but changes and modifications can be made, and some features can be used in different combinations without departing from the invention as defined in the claims.

What is claimed is:

1. A conveyor system including a first conveyor section along which all articles travelling in the system pass, a controlled station located along this first conveyor section, the control station including sorting designation controls with the memory for making them effective in the sequence of their actuation corresponding to the order in which the articles pass said control station, a plurality of other conveyor sections including switch systems in series with the first conveyor section and at different locations progressively further from the control station, each of these switch systems having means for deflecting a piece from the conveyor to a different sorting station, the various switch systems being responsive to the sorting designation controls in accordance with the sequential position of each article arriving at the respective switch systems, and characterized by means for identifying particular packages as programed at the central control station, and mechanism responsive to the identifying means and operable while the articles on the conveyor continue in motion including abutments movable transversely of the length of the conveyor system and providing positive means for displacing an article from the conveyor system.

2. The conveyor system described in claim 1 characterized by each switch means including a plurality of abutments spaced from one another longitudinally of the conveyor system, said longitudinally spaced abutments being independently operable, and the control means including controls for determining the number of said spaced abutments that operate for each particular article in accordance with the length of the article.

3. The conveyor system described in claim 2 characterized by the controls for determining the number of said spaced abutments that operate including different manually actuated devices that select the number of spaced abutments that will operate depending upon which of the manually operated devices an attendant operates after inspection of the length of the article, said manually actuated devices being at the control station.

4. The conveyor system described in claim 2 characterized by the longitudinally spaced abutments being correlated with one another so that the one that displaces the forward portion of an article operates ahead of the one that displaces a rearward portion of the article to turn the article at an acute angle to its original direction of travel and a direction corresponding to the desired direction of travel beyond the switch means.

5. The conveyor system described in claim 1 characterized by the switch means comprising a conveyor section with transversely extending rollers for supporting the articles as they advance along the conveyor system, and the abutment means being located between successive rollers and movable lengthwise of the rollers and also movable to different levels as to extend selectively above or remain below the top level of the rollers and the lowermost limit of the pieces travelling along the conveyor, each switch means being a short section of conveyor and the portions of the conveyor system between successive switch means being conveyor sections at least some of which are in line with portions of the other conveyor sections, and means for driving the short conveyor sections somewhat faster than the other sections whereby an article moving onto a short conveyor section opens up a space between itself and the next article on the conveyor system.

6. The conveyor system described in claim 5 characterized by the conveyor system including branch conveyor sections leading from the switch means to accumulation stations to which sorted articles are delivered, the switch means being conveyor sections that operate independently of said branch conveyor sections.

7. A conveyor system sorting station including a frame, a plurality of rollers rotatively supported by the frame and constituting a conveyor section along which articles travel, push-off means movable lengthwise of the rollers and transversely of the direction of travel of the articles along the conveyor, said push-off means including an element located at a fixed level between the plane of the top of the rollers and including also an abutment carried by said element and movable between a raised poistion in which the abutment extends above said plane and a lowered position in which the abutment is located below said plane, and mechanism that moves the abutment to its raised position while upward beyond a side of the article.

8. The conveyor system sorting station described in claim 7 characterized by the abutment including a finger, an endless belt by which the finger is carried, the control means including an actuator for causing the finger to move between a raised and a lowered position, and electrically operated means for the actuator responsive to the control signals.

9. A conveyor system sorting station including a frame, a plurality of rollers rotatively supported by the frame and constituting a conveyor section along which articles travel, push-off means movable lengthwise of the rollers and transversely of the direction of travel of the articles along the conveyor, said push-off means including an abutment movable into positions extending above and below the rollers, and control means that shift the push-off means above and below the rollers selectively in accordance with a pre-set sequence of signals, characterized by there being different push-off means between different rollers of the conveyor and each of the different push-off means having its own abutment and being responsive to a different signal from the control means, and a device for imposing a signal on the control means responsive to signal dependent upon the length of the article that is to be pushed off.

10. The conveyor system sorting station described in claim 9 characterized by each of the push-off means including an endless belt having a plurality of fingers spaced along its length, the control means for the push-off means including cams located along the course of the endless belt and moved between different positions by electric motor means that are actuated from the signals of the control means.

11. The conveyor system sorting station described in claim 9 characterized by a device at one location for moving the push-off means into operative position near one end of the travel of said push-off means, and another device at a different location for moving the push-off means into operative position at an intermediate region of its travel.

12. The conveyor system sorting station described in claim 11 characterized by means located at an intermediate region of the travel of the push-off means and selectively operable to render a push-off means inoperative at said intermediate region whereby the push-off means is operative during only the first part of its total possible travel.

13. The conveyor system sorting station described in claim 9 characterized by a device for moving the push-off means into operative position at one location along the path of travel of the push-off means, and another device at a different location along the path of travel of the push-off means for moving the push-off means into operative position, said devices being spaced from one another by a distance less than the total length of the path of travel of the push-off means whereby a push-off means can be maintained operative during only a portion of said travel of the push-off means.

References Cited

UNITED STATES PATENTS

| | | | |
|---|---|---|---|
| 2,362,079 | 11/1944 | McCann | 214—11 |
| 2,734,643 | 2/1956 | MacRae | 214—11 |
| 3,068,451 | 12/1962 | Bolander | 209—74 X |

M. HENSON WOOD, JR., *Primary Examiner.*

R. A. SCHACHER, *Assistant Examiner.*